United States Patent
Mitani et al.

(10) Patent No.: US 9,284,869 B2
(45) Date of Patent: Mar. 15, 2016

(54) PARTICULATE MATTER PROCESSING APPARATUS

(75) Inventors: Shinichi Mitani, Susono (JP); Hiroshi Nomura, Gotenba (JP); Eiji Murase, Gotenba (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 13/814,419

(22) PCT Filed: Mar. 16, 2011

(86) PCT No.: PCT/JP2011/056294
§ 371 (c)(1),
(2), (4) Date: Feb. 5, 2013

(87) PCT Pub. No.: WO2012/124087
PCT Pub. Date: Sep. 20, 2012

(65) Prior Publication Data
US 2014/0000248 A1    Jan. 2, 2014

(51) Int. Cl.
| | | |
|---|---|---|
| F01N 3/02 | (2006.01) | |
| F01N 3/021 | (2006.01) | |
| B03C 3/41 | (2006.01) | |
| B03C 3/49 | (2006.01) | |
| B03C 3/68 | (2006.01) | |

(Continued)

(52) U.S. Cl.
CPC . *F01N 3/021* (2013.01); *B03C 3/41* (2013.01); *B03C 3/49* (2013.01); *B03C 3/68* (2013.01);
(Continued)

(58) Field of Classification Search
CPC ............. F01N 9/00; F01N 11/00; F01N 3/01; F01N 3/021; F01N 11/007; F01N 2900/0601; F01N 2900/1402; B03C 3/41; B03C 3/49; B03C 3/68; B03C 2201/08; B03C 2201/24; B03C 2201/30; B03C 2201/32; G01N 27/04; F02D 41/1459; Y02T 10/20; Y02T 10/47

USPC .............. 60/272–324; 73/23.31, 23.32, 31.07
See application file for complete search history.

(56) References Cited

U.S. PATENT DOCUMENTS 2,349,250 A * 5/1944 Doan .............................. 436/32
4,361,810 A * 11/1982 Schlosser ...................... 324/468
(Continued)

FOREIGN PATENT DOCUMENTS

| JP | 06-173635 A | 6/1994 |
|---|---|---|
| JP | 08-261048 A | 10/1996 |

(Continued)

OTHER PUBLICATIONS

International Search Report of PCT/JP2011/056294 dated May 17, 2011.

*Primary Examiner* — Jesse Bogue
*Assistant Examiner* — Kelsey Stanek
(74) *Attorney, Agent, or Firm* — Sughrue Mion, PLLC

(57) ABSTRACT

A concentration of HC in an exhaust gas is estimated with a high degree of accuracy by making use of a particulate matter processing apparatus (1). In the particulate matter processing apparatus (1) in which a processing part (3) with an electrode (5) installed therein is arranged in an exhaust passage (2) of an internal combustion engine, wherein particulate matter is caused to aggregate by generating a potential difference between the electrode (5) and the processing part (3), provision is made for a power supply (6) that is connected to the electrode (5) and applies a voltage thereto, an insulation part (4) that insulates electricity between the processing part (3) and the exhaust passage (2), and a ground part (53) that grounds the processing part (3), a detection device (9) that detects an electric current in the ground part (53), and an estimation device (7) that estimates a concentration of HC in an exhaust gas based on the electric current detected by the detection device (9) at the time when the voltage is applied to the electrode (5) by means of the power supply (6).

6 Claims, 9 Drawing Sheets

(51) Int. Cl.
  *F01N 9/00*   (2006.01)
  *F01N 11/00*  (2006.01)
  *F02D 41/14*  (2006.01)
  *F01N 3/01*   (2006.01)

(52) U.S. Cl.
  CPC .. *F01N 3/01* (2013.01); *F01N 9/00* (2013.01); *F01N 11/00* (2013.01); *F02D 41/1459* (2013.01); *B03C 2201/08* (2013.01); *B03C 2201/24* (2013.01); *B03C 2201/30* (2013.01); *B03C 2201/32* (2013.01); *F01N 2240/04* (2013.01); *F01N 2900/0601* (2013.01); *F01N 2900/1402* (2013.01); *Y02T 10/20* (2013.01); *Y02T 10/47* (2013.01)

(56) References Cited

U.S. PATENT DOCUMENTS

| | | | | |
|---|---|---|---|---|
| 4,629,535 | A | * | 12/1986 | Oyama et al. ............... 205/784.5 |
| 5,884,610 | A | * | 3/1999 | Reddy ............................ 123/520 |
| 6,589,410 | B1 | * | 7/2003 | Shoji et al. ..................... 204/426 |
| 2011/0320171 | A1 | * | 12/2011 | Okayama et al. ............. 702/183 |

FOREIGN PATENT DOCUMENTS

| | | | |
|---|---|---|---|
| JP | 2006-105081 A | | 4/2006 |
| JP | 2006-194116 A | | 7/2006 |
| JP | 2006194116 A | * | 7/2006 |

* cited by examiner

Fig. 6

| COOLING WATER TEMPERATURE 20°C | | LOAD(%) | | | | | |
|---|---|---|---|---|---|---|---|
| | | 10 | 20 | 40 | 60 | 80 | 100 |
| NUMBER OF ENGINE REVOLUTIONS PER UNIT TIME (rpm) | 800 | NUMBER OF PARTICLES IN PARTICULATE MATTER(pieces/cm$^3$) | | | | | |
| | 1600 | | | | | | |
| | 2400 | | | | | | |
| | 3200 | | | | | | |
| | 4000 | | | | | | |
| | 4800 | | | | | | |
| | 5600 | | | | | | |
| | 6400 | | | | | | |

Fig. 7

| | | NUMBER OF PARTICLES IN PARTICULATE MATTER ($\times 10^5$ pieces/cm$^3$) | | | | | |
|---|---|---|---|---|---|---|---|
| | | 2 | 4 | 6 | 8 | 10 | 12 |
| AMOUNT OF EXHAUST GAS (g/sec) | 10 | VOLTAGE TO BE APPLIED(V) | | | | | |
| | 20 | | | | | | |
| | 40 | | | | | | |
| | 60 | | | | | | |
| | 80 | | | | | | |
| | 100 | | | | | | |
| | 120 | | | | | | |
| | 140 | | | | | | |

PARTICULATE MATTER PROCESSING APPARATUS

CROSS REFERENCE TO RELATED APPLICATIONS

This application is a National Stage of International Application No. PCT/JP2011/056294 filed Mar. 16, 2011, the contents of all of which are incorporated herein by reference in their entirety.

TECHNICAL FIELD

The present invention relates to a particulate matter processing apparatus.

BACKGROUND ART

There has been known a technique in which a discharge electrode is arranged in an exhaust passage of an internal combustion engine, and a corona discharge is caused to occur from the discharge electrode, whereby particulate matter (hereinafter also referred to as PM) is charged and condensed or aggregated (see, for example, a first patent document). By the condensation or aggregation of the particulate matter, the number of particles in the particulate matter can be decreased. Moreover, the sizes of particles in the particulate matter become large, so when a filter is arranged at a downstream side, it becomes easy to trap the particulate matter with the filter.

In addition, there has also been known a technique in which when an electric current passing through a discharge electrode is equal to or more than a predetermined value, it is determined that particulate matter has adhered to the discharge electrode, and an applied voltage to the electrode is caused to increase so as to remove the particulate matter from the discharge electrode (see, for example, a second patent document).

Moreover, there has further been known a technique in which an insulator is arranged between an electrode and a housing on which this electrode is mounted so as to prevent electricity from flowing therebetween, wherein in cases where an average current in a predetermined period of time at the time when an inspection voltage, being about a fraction of a corona discharge voltage, is applied to the electrode is equal to or greater than a predetermined value, a determination is made that the insulation performance of the insulator is in a dropped state due to the adhesion of particulate matter (see, for example, a third patent document).

With this technique, a flow of electricity through substances adhered to a surface of the insulator is detected. Here, even in cases where a voltage, which is lower than a voltage at which a strong electric discharge such as a corona discharge or the like occurs, is applied to an electrode, electricity can flow through substances floating in an exhaust gas. However, in the past, no consideration has been given to an electric current which is detected at the time when electricity flows through the substances floating in the exhaust gas. In addition, the electric current at this time has not been utilized.

Here, note that there has also been known a technique in which in an engine where ignition timing is retarded immediately after starting thereof, the air fuel ratio of a mixture is controlled in a feedback manner, while detecting HC in an exhaust passage by the use of an ion sensor arranged therein (see, for example, a fourth patent document). However, assuming that both the ion sensor and a particulate matter processing apparatus are provided together, an increase in costs will result, and at the same time, a space for arranging both of them will have to be obtained.

PRIOR ART REFERENCES

Patent Documents

First Patent Document: Japanese patent application laid-open No. 2006-194116
Second Patent Document: Japanese patent application laid-open No. 2006-105081
Third Patent Document: Japanese patent application laid-open No. H06-173635
Fourth Patent Document: Japanese patent application laid-open No. H08-261048

SUMMARY OF THE INVENTION

Problems to be Solved by the Invention

The present invention has been made in view of the problems as referred to above, and has for its object to estimate a concentration of HC in an exhaust gas with a high degree of accuracy by making use of a particulate matter processing apparatus.

Means for Solving the Problems

In order to achieve the above-mentioned object, a particulate matter processing apparatus according to the present invention, in which a processing part with an electrode installed therein is arranged in an exhaust passage of an internal combustion engine, wherein particulate matter is caused to aggregate by generating a potential difference between the electrode and the processing part, is provided with:

a power supply that is connected to said electrode and applies a voltage thereto;

an insulation part that insulates electricity between said processing part and said exhaust passage; and a ground part that grounds said processing part;

a detection device that detects an electric current in said ground part; and an estimation device that estimates a concentration of HC in an exhaust gas based on the electric current detected by said detection device at the time when the voltage is applied to said electrode by means of said power supply.

That is, the detection device detects the electric current at an electric potential reference point side from the electrode. In general, wiring is made often longer or thicker at a power supply side from the electrode than at a ground side from the electrode. In addition, electric charges may be stored at the power supply side from the electrode. Then, in cases where an electric current is detected in the power supply side from the electrode, even if the electric current passing through the electrode changes, the rising and falling of the electric current detected by the current detection device at that time become slow. For this reason, it may be difficult to detect the electric current in an accurate manner.

On the other hand, in the ground side from the electrode, wiring can be made relatively short and thin. For this reason, in cases where an electric current is detected in the ground side from the electrode, it is possible to detect the electric current in a more accurate manner.

In addition, due to the provision of the insulation part, electricity is suppressed from flowing to other than the ground part. According to this, an electric current can be detected by means of the current detection device in an accurate manner.

Here, when the voltage is applied to the electrode, the particulate matter can be electrified or charged. The particulate matter thus charged is caused to move toward an inner wall of the processing part by means of a Coulomb force or a flow of the exhaust gas. The particulate matter, which has reached the inner wall of the processing part, releases electrons to the processing part, so electricity flows to the ground side rather than to the electrode. Then, the particulate matter, which has released the electrons, aggregates with other particulate matter which exists nearby, so it is possible to decrease the number of particles.

Moreover, when HC, which is unburnt fuel, is contained in the exhaust gas, the HC serves as a carrier, so when a voltage is applied to the electrode, an electric current passes to it through the HC. This electric current is detected in the detection device. In addition, there is a correlation between the concentration of HC in the exhaust gas and the detected electric current. Besides, in cases where the electric current passes through the HC, the electric current detected is larger than in cases where the electric current passes through the particulate matter. That is, when looking at the magnitude of the electric current detected in the detection device, it can be estimated that HC exists in the exhaust gas. Then, the higher the concentration of HC in the exhaust gas, the larger the electric current becomes, so the concentration of HC can be estimated based on the electric current detected in the detection device. In addition, due to the provision of the insulation part, the electric current can be detected by means of the detection device in an accurate manner, thus making it possible to obtain the concentration of HC in an accurate manner.

Further, in the present invention, provision can be made for a control device which serves to retard the ignition timing of said internal combustion engine more in cases where the electric current detected by said detection device is larger than a first threshold value, than in cases where the detected electric current is equal to or less than the first threshold value.

Here, in an internal combustion engine of the spark ignition type, by retarding the ignition timing, the oxidation reaction of HC in the exhaust passage can be facilitated, so the concentration of HC can be reduced. Also, by retarding the ignition timing, the temperature of the exhaust gas can be caused to go up, so the temperature of a catalyst can be caused to rise in a quick manner. Here, note that the catalyst may be provided at the upstream side of the processing part. Then, by retarding the ignition timing at the time when the concentration of HC is high, the temperature of the catalyst can be caused to go up quickly, while reducing the concentration of HC. When the catalyst rises in temperature and is thereby activated, the HC can be decreased or removed. In addition, if the catalyst is provided at the upstream side of the processing part, HC will hardly flow into the processing part after the catalyst has been activated, as a result of which the electric current detected by the detection device will not be substantially affected by the influence of HC. Here, note that the first threshold value referred to herein can be an electric current which is detected at the time when the concentration of HC becomes an upper limit value of its allowable range.

In addition, in the present invention, said control device can make the amount of retardation of the ignition timing of said internal combustion engine larger in accordance with the increasing electric current detected by said detection device.

The concentration of HC and the electric current detected by the detection device are in correlation with each other, so it can be estimated that the larger the electric current detected by the detection device, the higher is the concentration of HC.

On the other hand, the more the ignition timing of the internal combustion engine is retarded, the larger the reduction effect of HC becomes. Accordingly, it is possible to suppress the concentration of HC from being reduced in an effective manner by making larger the amount of retardation of the ignition timing in accordance with the increasing electric current detected by the detection device. In addition, when the concentration of HC is low, the ignition timing is approaching an optimal ignition timing by making smaller the amount of retardation of the ignition timing, so deterioration of fuel economy can be suppressed, for example. Here, note that the higher the concentration of HC estimated by the estimation device, the larger the amount of retardation of the ignition timing of the internal combustion engine may be made.

Moreover, in the present invention, said control device can retard the ignition timing at the time of starting of said internal combustion engine.

At the time of starting of the internal combustion engine, a lot of HC is discharged. In addition, because the temperature of the catalyst is low, it may be difficult to remove HC. Accordingly, at the time of starting of the internal combustion engine, a decrease in the concentration of HC is required. In contrast to this, by retarding the ignition timing at the time of starting of the internal combustion engine, it is possible to reduce the concentration of HC. Here, note that a period of time in which the amount of HC discharged from the beginning of starting of the internal combustion engine is large may be the time of starting of the internal combustion engine. Also, a period of time until the catalyst is activated or the warming up of the internal combustion engine is completed may be the time of starting of the internal combustion engine. In addition, the ignition timing may be retarded immediately after the starting of the internal combustion engine.

Further, in the present invention, in cases where the electric current detected by said detection device is equal to or less than a second threshold value, processing to cause the particulate matter to aggregate can be carried out.

That is, in cases where the concentration of HC is high, the processing to cause the particulate matter to aggregate is not carried out. Here, when the concentration of HC is high, the electric current passing through the electrode becomes large. Then, there is a fear that the particulate matter processing apparatus may deteriorate. In addition, electric power consumption becomes large, so there is also a fear that fuel economy may get worse. In contrast to this, by making the voltage to be applied smaller, it is possible to suppress the electric current from becoming large. On the other hand, when the concentration of HC is low, the voltage to be applied can be made larger. Then, by making the voltage to be applied larger, more electrons can be caused to release from the electrode, as a result of which the aggregation of particulate matter can be further facilitated.

Here, note that when the voltage to be applied is made too large, a strong electric discharge such as a corona discharge, an arc discharge, etc., will take place. When such a strong electric discharge takes place, the particulate matter will be made finer by means of high speed electrons. Then, by increasing the voltage to be applied as much as possible in a range in which such a strong discharge does not take place, it is possible to facilitate the aggregation of the particulate matter. When a strong electric discharge tales place, a pulse current is generated, so in cases where a pulse current has been detected in the detection device, by reducing the voltage to be applied, it is possible to suppress the particulate matter from being made finer. The processing to cause the particulate matter to aggregate may also be processing to carry out feedback control of the voltage to be applied based on the electric current detected in the detection device. Here, note that in cases where the electric current detected by the detection device is equal to or less than the second threshold value, the voltage to be applied may also be just made higher than in cases where the detected electric current is larger than the second threshold value. The second threshold value is an upper limit value in cases where the detected electric current is not affected by the influence of the concentration of HC in the exhaust gas, and can be made to an upper limit value of the electric current which can cause the particulate matter to aggregate.

Moreover, in the present invention, provision can be made for:

a regeneration device that regenerates said electrode;

a determination device that determines, based on the electric current detected by said detection device, whether regeneration of the electrode by said regeneration device is to be carried out; and a prohibition device that prohibits the determination by said determination device in cases where the electric current detected by said detection device is larger than a third threshold value.

When electricity flows between the electrode and the processing part through substances such as particulate matter, water or the like, adhered to or deposited on the electrode, the electric current detected by the detection device will become large. For example, when the electric current thus detected is larger than an electric current estimated from the state of the exhaust gas at that time, a determination can be made that adhered substances exist on the electrode.

Here, when the substances, such as particulate matter, water or the like, adhere to the electrode, it becomes difficult to charge particulate matter floating in the exhaust gas, and hence, it becomes difficult to cause the particulate matter to aggregate. For this reason, processing to remove the adhered substances on the electrode is carried out. The removal of the adhered substances can be carried out by raising the temperature of the electrode, for example. Here, note that the removal of the adhered substances from the electrode is called the regeneration of the electrode.

However, in cases where the concentration of HC in the exhaust gas is high, the electric current detected by the detection device becomes large, as a result of which this situation is difficult to distinguish from the case where electricity flows through the adhered substances on the electrode. Accordingly, in cases where the detected electric current is larger than the third threshold value, the determination by the determination device is prohibited. As a result of this, it is possible to suppress regeneration processing of the electrode from being carried out, in spite of the fact that such regeneration processing is not necessary. For this reason, to raise the temperature of the electrode is not carried out, for example, when there is no necessity, so fuel economy can be improved. Here, note that the third threshold value is an upper limit value in cases where the detected electric current is not affected by the influence of the concentration of HC in the exhaust gas, and can be made to an upper limit value of the electric current at which it can be determined whether the regeneration of the electrode is necessary. The third threshold value may also be the same as the second threshold.

Effect of the Invention

According to the present invention, the concentration of HC in an exhaust gas can be estimated with a high degree of accuracy by making use of the particulate matter processing apparatus.

BRIEF DESCRIPTION OF THE DRAWINGS

[FIG. 6] is a view showing an example of a map for calculating the number of particles in particulate matter from engine revolutions per minute and an engine load.

[FIG. 7] is a view showing an example of a map for calculating a voltage to be applied (V) based on an amount of exhaust gas (g/sec) from an internal combustion engine, and the number of particles in particulate matter ($\times 10^5$ pieces/$cm^3$).

MODES FOR CARRYING OUT THE INVENTION

Hereinafter, reference will be made to specific embodiments of a particulate matter processing apparatus according to the present invention based on the attached drawings.

(First Embodiment)

Figure 1:
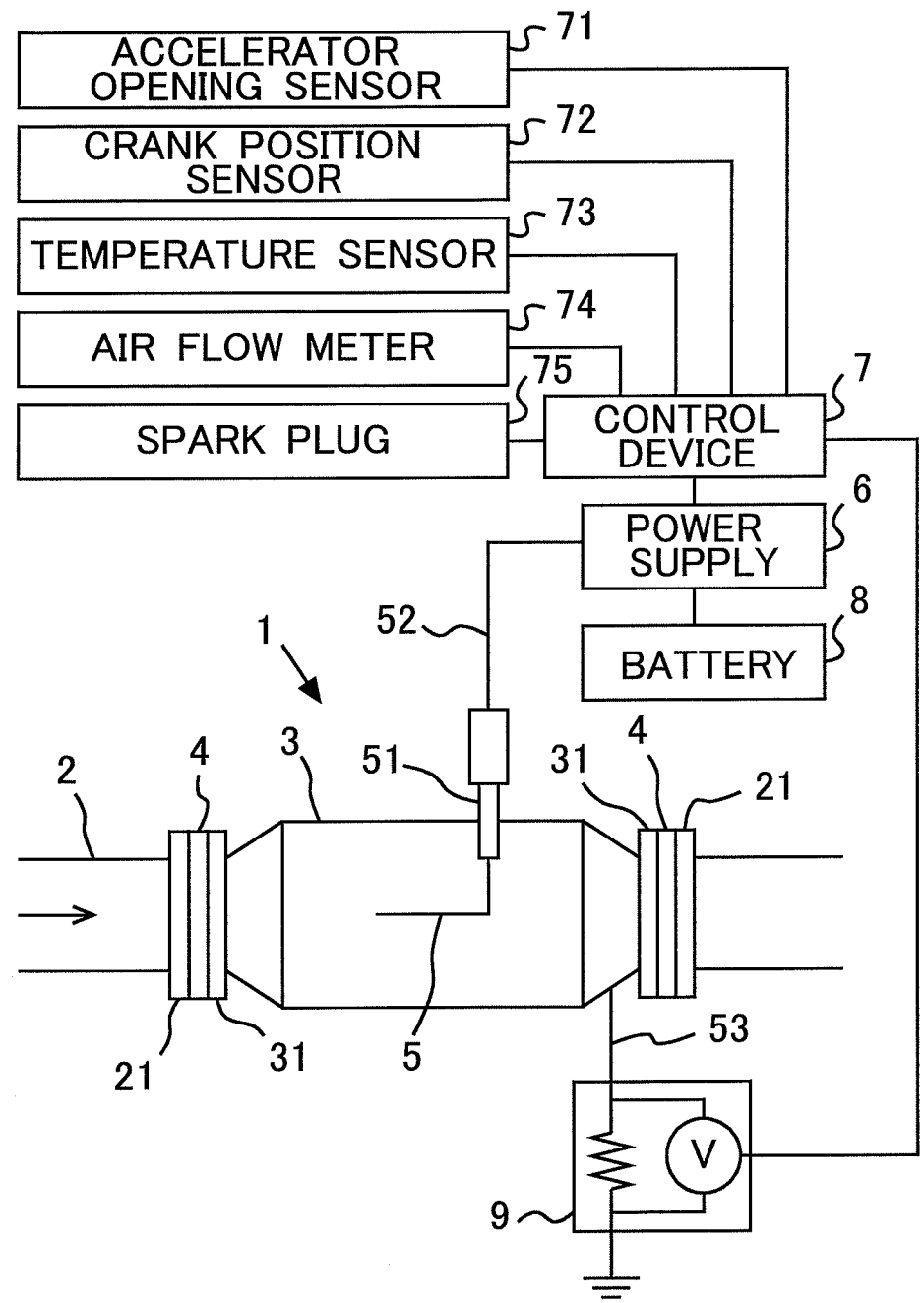
[FIG. 1] is a view showing the schematic construction of a particulate matter processing apparatus according to an embodiment of the present invention.

FIG. 1 is a view showing the schematic construction of a particulate matter processing apparatus 1 according to this first embodiment of the present invention. The particulate matter processing apparatus 1 is arranged in an exhaust passage 2 of a gasoline engine of a spark ignition type. The internal combustion engine is provided with a spark plug 75.

The particulate matter processing apparatus 1 is constructed to be provided with a housing 3 which is connected at its opposite ends with the exhaust passage 2. As a material for the housing 3, there is used a stainless steel material. The housing 3 is formed into a hollow cylindrical shape with its diameter being larger than that of the exhaust passage 2. The opposite end portions of the housing 3 are each formed into a tapered shape of which the cross-sectional area becomes smaller as they become closer to their end. Here, note that in FIG. 1, an exhaust gas flows through the exhaust passage 2 in the direction of an arrow, and flows into the interior of the housing 3. For this reason, the housing 3 may also be a part of the exhaust passage 2. Here, note that in this embodiment, the housing 3 corresponds to a processing part in the present invention.

The exhaust passage 2 and the housing 3 are connected to each other through insulation parts 4. The insulation parts 4 are each made of an electrically insulating material. The insulation parts 4 are each sandwiched between a flange 21, which is formed at an end of the exhaust passage 2, and a flange 31, which is formed at one adjacent end of the housing 3. The exhaust passage 2 and the housing 3 are fastened to each other, for example, by means of bolts and nuts. Then, these bolts and nuts are also subjected to insulation processing so as to prevent electricity from flowing through these bolts and nuts. In this manner, electricity is prevented from flowing between the exhaust passage 2 and the housing 3.

An electrode 5 is mounted on the housing 3. The electrode 5 penetrates through a side surface of the housing 3, extends from the side surface of the housing 3 in the direction of a central axis thereof, is then bent to an upstream side of the flow of the exhaust gas in the vicinity of the central axis, and extends toward the upstream side of the flow of the exhaust gas in parallel to the central axis. For this reason, an end of the electrode 5 is located in the vicinity of the central axis of the housing 3. In addition, the electrode 5 is provided with an insulator part 51 which is made of an electrically insulating material, and which serves to prevent electricity from flowing between the electrode 5 and the housing 3. This insulator part 51 is located between the electrode 5 and the housing 3, and has a function of insulating electricity and at the same time fixedly securing the electrode 5 to the housing 3.

Then, the electrode 5 is connected to a power supply 6 through a power supply side electric wire 52. The power supply 6 can supply electricity to the electrode 5 and at the same time change a voltage to be applied thereto. This power supply 6 is connected to a control device 7 and a battery 8 through electric wires, respectively. The control device 7 controls the voltage which is applied to the electrode 5 by the power supply 6.

Also, a ground side electric wire 53 is connected to the housing 3, so that the housing 3 is connected to ground through the ground side electric wire 53. A detection device 9, which serves to detect the electric current passing through the ground side electric wire 53, is provided or connected to the ground side electric wire 53. The detection device 9 detects the electric current, for example, by measuring a potential difference between opposite ends of a resistor which is provided or inserted in the middle of the ground side electric wire 53. This detection device 9 is connected to the control device 7 through an electric wire. Then, the electric current detected by the detection device 9 is inputted to the control device 7. Here, note that in this embodiment, the ground side electric wire 53 corresponds to a ground portion in the present invention.

Here, note that an accelerator opening sensor 71, a crank position sensor 72, a temperature sensor 73, and an air flow meter 74 are connected to the control device 7. The accelerator opening sensor 71 detects an engine load by outputting an electric signal corresponding to an amount of depression of an accelerator pedal at which a driver has depressed or stepped down the accelerator pedal. The crank position sensor 72 detects the number of engine revolutions per unit time. The temperature sensor 73 detects the temperature of the internal combustion engine by detecting the temperature of cooling water or the temperature of lubricating oil in the internal combustion engine. The air flow meter 74 detects an amount of intake air sucked into the internal combustion engine. In addition, the control device 7 controls the ignition timing of the spark plug 75.

In the particulate matter processing apparatus 1 as constructed in this manner, electrons are released or emitted from the electrode 5 by applying a negative high direct current voltage from the power supply 6 to the electrode 5. That is, electrons are caused to be released from the electrode 5 by making the electric potential of the electrode 5 lower than that of the housing 3. Then, particulate matter in the exhaust gas can be charged to negative polarity by means of these electrons. The particulate matter thus charged to negative polarity is caused to move by means of a Coulomb force and a gas stream of the exhaust gas. Thereafter, when the particulate matter reaches the housing 3, the electrons, which have charged the particulate matter to negative polarity, are released to the housing 3. The particulate matter, which has released the electrons to the housing 3, aggregates, thereby making larger the particle diameter or size of each particle. In addition, the number of particles in the particulate matter is reduced due to the aggregation of particulate matter. That is, by applying the voltage to the electrode 5, the diameters or sizes of particles in the particulate matter can be made larger, and the number of particles in the particulate matter can be made to reduce.

It is to be noted that in this embodiment, the electrode 5 is bent toward the upstream side of the flow of the exhaust gas, but instead of this, it may be bent toward a downstream side thereof. Here, when the electrode 5 is bent toward the upstream side of the flow of the exhaust gas, as in the case of this embodiment, it is difficult for particulate matter to adhere to or deposit on the insulator part 51. That is, particulate matter can be caused to be charged at the upstream side of the insulator part 51, so that the particulate matter goes to an inner peripheral surface of the housing 3. For this reason, particulate matter colliding with the insulator part 51 decreases, and hence, it becomes difficult for particulate matter to adhere to the insulator part 51. However, if the electrode 5 is bent toward the upstream side of the flow of the exhaust gas, the electrode 5 will be liable to be deformed due to a force or pressure received from the flow of the exhaust gas. For this reason, this is suitable in cases where the electrode 5 is short. On the other hand, if the electrode 5 is bent toward the downstream side of the flow of the exhaust gas, particulate matter will be liable to adhere to the insulator part 51, but the electrode 5 will be less prone to deform even if it receives a force or pressure from the flow of the exhaust gas. For this reason, the electrode 5 is high in durability and reliability, and can be made long.

Incidentally, if HC, being unburnt fuel, is contained in the exhaust gas, upon application of a voltage to the electrode 5, the HC will serve as a carrier for electrons, so that an electric current will flow. When the concentration of the HC is high, an electric current flows which is larger than an electric current passing through the particulate matter in the exhaust gas.

Figure 2:
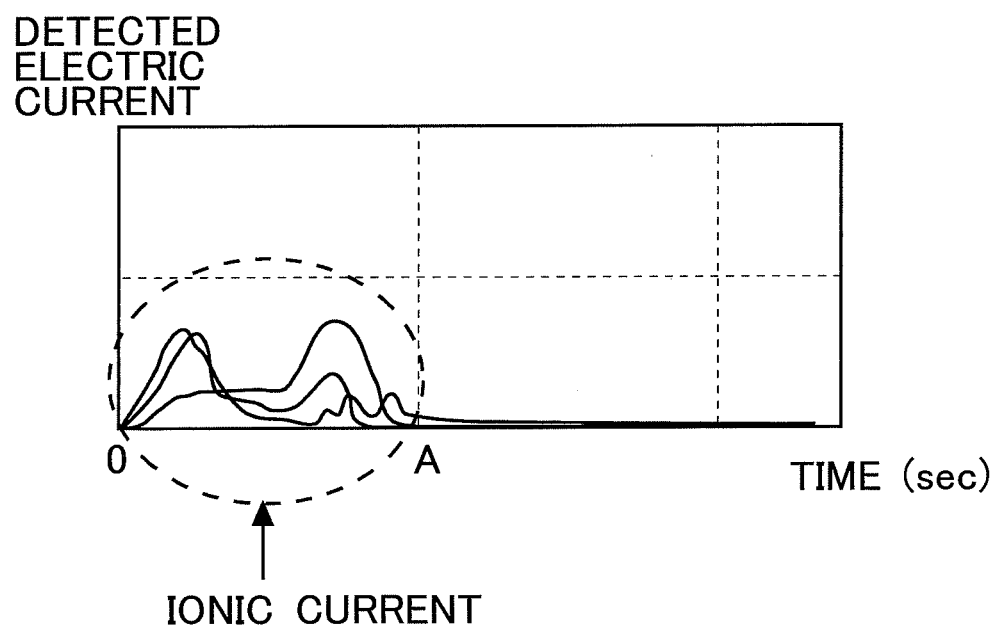
[FIG. 2] is a view showing the change over time of an electric current detected by a detection device.

Here, FIG. 2 is a view showing the change over time of the electric current detected by the detection device 9. The axis of abscissa is the time elapsed from starting of the internal combustion engine. When time is 0, the internal combustion engine is started. FIG. 2 shows the changes over time of electric currents detected at individual voltages applied, respectively, by changing the voltage to be applied. As shown in FIG. 2, at any voltage to be applied, detected electric currents are relatively large during a period of time from the starting of the internal combustion engine up to a point in time A, but electric currents detected after that are relatively small. These relatively large detected electric currents are ionic currents generated by HC in the exhaust gas. That is, during the period of time from the starting of the internal combustion engine up to about the point in time A, the detected electric currents are relatively large due to the ionic current generated by the HC discharged by the internal combustion engine. Here, note that the point in time A can be set, for example, to 20 seconds.

On the other hand, after the period of time from the starting of the internal combustion engine to about the point in time A has elapsed, the concentration of HC flowing into the housing 3 has dropped, and an ionic current is not almost generated. Here, note that in cases where the concentration of HC drops, it is considered the case where the amount of HC discharged from the internal combustion engine drops, or the case where HC is purified by activation of a catalyst. Then, the electric current detected at this time is mainly an electric current which passes through the particulate matter floating in the exhaust gas. Here, note that in the detected electric current shown in FIG. 2, an ionic current is generated in the period of time from the starting of the internal combustion engine to about the point in time A, but the time at which an ionic current is generated varies according to an operating state of the internal combustion engine, the kind of fuel, etc.

Then, the ionic current due to the HC is by far larger than the electric current which passes through the particulate matter. For this reason, it can be said that the electric current detected by the detection device 9 is in correlation with the concentration of HC in the exhaust gas. Thus, the concentration of HC in the exhaust gas can be estimated by detecting the electric current. That is, the particulate matter processing apparatus 1 can be used as an HC sensor which detects the concentration of HC in the exhaust gas. The relation between the electric current detected by the detection device 9 and the concentration of HC has been able to be beforehand calculated through experiments, etc.

Then, when the concentration of HC is higher than an allowable upper limit (a first threshold), ignition timing is retarded so as to reduce the concentration of HC. Here, by retarding the ignition timing, the temperature of the gas discharged from the internal combustion engine goes up. For this reason, the reaction of HC and oxygen in the exhaust passage 2 is facilitated, and hence, the concentration of HC drops. That is, even if the concentration of HC in an engine cylinder is high, the concentration of HC in the exhaust passage 2 can be decreased. In addition, although a catalyst is generally arranged in the exhaust passage 2, the temperature of the catalyst goes up quickly due to the temperature of the exhaust gas becoming high. Then, the catalyst is activated, whereby the concentration of HC drops. Here, note that in this embodiment, a catalyst for oxidizing HC may be arranged at the upstream side of the particulate matter processing apparatus 1. As a result of this, HC almost stops flowing into the housing 3 after the catalyst has been activated, thus resulting in no increase in the detected electric current due to HC. Then, it is possible to carry out the control for aggregating particulate matter in an easy manner.

In addition, due to the provision of the insulation parts 4, it is suppressed that electricity passes to the exhaust passage 2. Accordingly, an electric current, which passes to the housing 3 through the particulate matter or HC, is detected by the detection device 9. Moreover, the detection accuracy of the electric current can be enhanced by detecting the electric current in the ground side electric wire 53. In general, the power supply side electric wire 52 is often longer in wiring length or thicker in wiring diameter than the ground side electric wire 53. Then, if an electric current is detected in the power supply side electric wire 52, the rising and falling of the detected electric current become slower than an actual change of the electric current. For this reason, there is a fear that the detection accuracy of the electric current may become low.

On the other hand, in the ground side electric wire 53, wiring can be made relatively short and thin. For this reason, the response to an actual change of electric current is higher when the electric current is detected in the ground side electric wire 53. Accordingly, by detecting an electric current in the ground side electric wire 53, it is possible to detect the electric current in a more accurate manner. That is, it is possible to estimate the concentration of HC in a more accurate manner.

Figure 3:
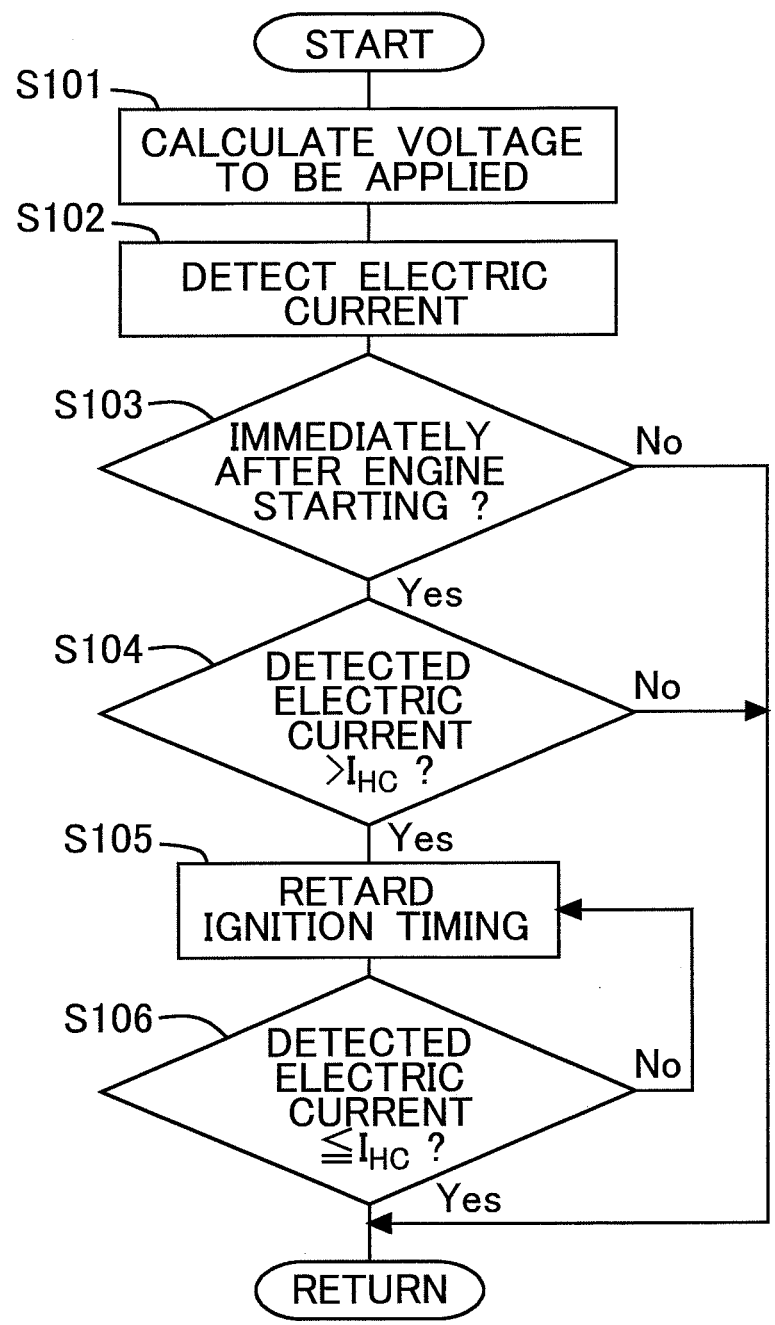
[FIG. 3] is a flow chart showing a control flow of ignition timing according to a first embodiment.

Next, FIG. 3 is a flow chart showing a control flow or routine of ignition timing according to this embodiment. This routine is carried out by means of the control device 7 in a repeated manner at each predetermined time interval.

In step S101, a voltage to be applied to the electrode 5 is calculated. The voltage to be applied is set according to the number of particles in the particulate matter (pieces/cm$^3$) to be estimated. This number of particles in the particulate matter is the number of particles in the particulate matter which are discharged from the internal combustion engine, and is the number of particles in the particulate matter before the particulate matter flows into the housing 3. The number of particles in the particulate matter has a correlation with the number of engine revolutions per unit time, the engine load, and the temperature of the internal combustion engine (e.g., the temperature of lubricating oil or the temperature of cooling water), and hence is calculated based on these values. A plurality of maps used for calculating the number of particles in the particulate matter from the number of engine revolutions per unit time and the engine load may be stored according to the temperature of the internal combustion engine, so that the number of particles in the particulate matter may be calculated based on these maps.

Here, note that the number of engine revolutions per unit time is detected by the crank position sensor 72, and the engine load is detected by the accelerator opening sensor 71. In addition, the temperature of the internal combustion engine is detected by the temperature sensor 73. Also, a sensor for detecting the number of particles in the particulate matter may be mounted on the exhaust passage 2 at a location upstream of the housing 3, so that the number of particles in the particulate matter is detected by this sensor.

Then, the voltage to be applied is calculated based on the number of particles in the particulate matter and the amount of exhaust gas (g/sec) in the internal combustion engine. Such a relation may have beforehand been obtained through experiments, etc., and made into a map. The amount of exhaust gas in the internal combustion engine has a correlation with the amount of intake air in the internal combustion engine, and hence, can be obtained based on the amount of intake air detected by the air flow meter 74.

Here, the smaller the amount of exhaust gas, the smaller the inertia force of the particulate matter becomes, and hence, the influence of an electrostatic action becomes relatively larger. For this reason, it becomes easy for the particulate matter to aggregate. Accordingly, the smaller the amount of exhaust gas, with the smaller voltage to be applied, the particulate matter aggregates. For this reason, the smaller the amount of exhaust gas, the smaller the voltage to be applied is made. In addition, the more the number of particles in the particulate matter, the shorter become the distances between adjacent particles in the particulate matter, and hence, the influence of the electrostatic action becomes relatively larger. For this reason, the more the number of particles in the particulate matter, with the smaller voltage to be applied, the particulate matter aggregates. As a result, the more the number of particles in the particulate matter, the smaller the voltage to be applied is made. In addition, the voltage to be applied may also be, for example, such a value that the reduction or decrease rate of the number of particles in the particulate matter becomes a predetermined value (e.g., 40%). Further, the voltage to be applied may also be a specified value which has been set beforehand. In this case, the voltage to be applied may also be a minimum value with which the concentration of HC can be detected. That is, the voltage to be applied may be made smaller than that at the time of causing the particulate matter to aggregate.

Then, after the voltage to be applied has been calculated, the routine goes to step S102, in which an electric current is detected. This electric current is a value which is detected by the detection device 9.

In step S103, it is determined whether the internal combustion engine is in a state immediately after starting thereof. In step S103, it is determined whether it is the time when the concentration of HC can become high. That is, the state "immediately after starting of the internal combustion engine" means the time when the combustion state gets worse easily, or when it is before the catalyst becomes activated, or when the amount of HC discharged from the internal combustion engine is relatively large (it may be the time when the concentration of HC is relatively high), or the like. A determination may also be made that a predetermined period of time from the beginning of starting of the internal combustion engine is the time "immediately after starting of the internal combustion engine". In addition, a determination may also be made that a period of time in which control for retarding ignition timing is being carried out from the beginning of starting of the internal combustion engine. Moreover, in step S103, it may also be determined whether it is the time when the internal combustion engine is being started.

Then, in cases where an affirmative determination is made in step S103, the routine goes to step S104, whereas in cases where a negative determination is made, it is not necessary to make the concentration of HC lower, and hence this routine is ended.

In step S104, it is determined whether the detected electric current obtained in step S102 is larger than a threshold value $I_{HC}$. In this step, it is determined whether it is necessary to make the concentration of HC lower. The threshold value $I_{HC}$ is a detected electric current at the time when the concentration of HC becomes an upper limit value of its allowable range. This threshold value $I_{HC}$ has beforehand been obtained through experiments, etc., and stored in the control device 7. Here, note that in this embodiment, the threshold value $I_{HC}$ corresponds to a first threshold value in the present invention.

Then, in cases where an affirmative determination is made in step S104, the routine goes to step S105, whereas in cases where a negative determination is made, it is not necessary to make the concentration of HC lower, and hence this routine is ended. Here, note that in step S104, a determination based on the detected electric current is carried out, but the detected electric current and the concentration of HC are in correlation with each other, so the concentration of HC may be calculated from the detected electric current, and it may be determined whether the concentration of HC thus obtained has exceeded the allowable range. If the relation between the detected electric current and the concentration of HC has beforehand been obtained through experiments, etc., and stored in the control device 7, the concentration of HC will be able to be calculated from the detected electric current. That is, in this embodiment, the control device 7, which carries out the processing of step S104, corresponds to an estimation device in the present invention.

In step S105, the ignition timing is retarded. A preset value can be used for an amount of retardation at this time. In addition, the larger the detected electric current, i.e., the higher the concentration of HC, the larger the amount of retardation may become. That is, the higher the concentration of HC, the larger the ionic current becomes, and hence, the larger the detected electric current becomes. When the concentration of HC is high, the concentration of HC is reduced by making larger the amount of retardation of the ignition timing. The relation between the detected electric current and the ignition timing may have beforehand been obtained through experiments, etc., and made into a map.

In step S106, it is determined whether the detected electric current is equal to or less than the threshold value $I_{HC}$. That is, it is determined whether the concentration of HC has dropped into the allowable range by having made larger the amount of retardation of the ignition timing.

In cases where an affirmative determination is made in step S106, the routine is ended, whereas in cases where a negative determination is made, the routine returns to step S105, and the ignition timing is retarded again.

In this manner, the concentration of HC in the exhaust gas can be estimated by the use of the detected electric current. Then, by carrying out feedback control of the amount of retardation of the ignition timing based on the detected electric current or the concentration of HC, it is possible to decrease the concentration of HC in the exhaust gas. Here, the concentration of HC may change according to the kind of fuel, but even in cases where any fuel is used, the concentration of HC to be discharged can be controlled in such a manner that it becomes equal to or less than the threshold value.

(Second Embodiment)

In this second embodiment, after the concentration of HC in the exhaust gas becomes equal to or less than the threshold value, PM reduction control or regeneration processing of the electrode 5 is carried out. The other devices, parts and so on are the same as those in the first embodiment, so the explanation thereof is omitted.

Here, PM reduction control is processing for applying a voltage suitable for the aggregation of particulate matter. Here, when a negative voltage applied to the electrode 5 is made larger, more electrons will be released or emitted from the electrode 5. As a result of this, the condensation or aggregation of particulate matter can be facilitated, so the number of particles in the particulate matter can be decreased. However, when the voltage to be applied to the electrode 5 is made too large, a strong electric discharge such as a corona discharge, an arc discharge, etc., can take place. When such a strong electric discharge takes place, particulate matter will be made finer by means of high speed electrons. Accordingly, in order to facilitate the aggregation of particulate matter, it is preferable to adjust the voltage to be applied to a voltage lower than that at which a strong electric discharge such as a corona discharge, etc., takes place. That is, particulate matter can be made to aggregate even if a strong electric discharge such as a corona discharge, etc., does not occur.

On the other hand, when the voltage to be applied becomes relatively large, the electric current detected by the detection device 9 becomes large, and at the same time, a pulse current is generated. Then, the larger the voltage to be applied, the higher the frequency at which a pulse current is generated becomes. This pulse current is generated by a strong electric discharge such as a corona discharge, etc.

Accordingly, in this embodiment, when a pulse current is generated, the voltage to be applied is made smaller. This suppresses the pulse current from being generated, and also suppresses the number of particles in particulate matter from being increased. On the other hand, the voltage to be applied is made larger until a pulse current is generated. As a result of this, the voltage to be applied can be made as high as possible, so the aggregation of particulate matter can be further facilitated. Here, note that before a pulse current is generated, by reading from the electric current a sign that a pulse current will be generated, the voltage to be applied may be made smaller before the generation of a pulse current.

In addition, the regeneration processing of the electrode 5 is processing for removing substances such as particulate matter, water, and so on, which have been adhered to the electrode 5 including the insulator part 51. When particulate matter, etc., adheres to the electrode 5, electricity will flow between the electrode 5 and the housing 3 through the adhered substances. That is, electrical insulation is decreased. Then, it becomes difficult to charge the particulate matter floating in the exhaust gas, and hence, it becomes difficult to cause the particulate matter to aggregate.

Accordingly, in this embodiment, it is determined whether electricity flows between the electrode 5 and the housing 3 through the adhered substances, and in cases where a determination is made that electricity flows therebetween, the regeneration processing of the electrode 5 is carried out. The regeneration of the electrode 5 is carried out, for example, by raising the temperature of the electrode 5, or making higher the concentration of oxygen in the exhaust gas.

For example, the regeneration processing of the electrode 5 is carried out by applying a voltage to the electrode 5 from the power supply 6, while causing the electrode 5 to be short-circuited. Due to the short circuit of the electrode 5, the temperature of the electrode 5 can be raised, so that the adhered substances can be removed by being combusted or evaporated. In addition, in order to oxidize the particulate matter in a quick manner, it is preferable that the oxygen concentration in the exhaust gas be higher. For this reason, the concentration of oxygen in the exhaust gas may be made high, while applying a voltage to the electrode 5. For example, in a hybrid vehicle equipped with an internal combustion engine and a motor as driving sources of the vehicle, a crankshaft of the internal combustion engine can be caused to rotate by means of the motor, without supplying fuel to the internal combustion engine. As a result of this, air can be discharged from the internal combustion engine, thus making it possible to increase the concentration of oxygen in the exhaust gas. Moreover, the number of engine revolutions per unit time can once be raised before the internal combustion engine is stopped, so that air can be made to discharge into the exhaust passage by stopping the supply of fuel at the time when the number of engine revolutions per unit time is in a high state. Then, it is preferable that when the internal combustion engine is thereafter stopped, the electrode 5 be caused to short circuit or the voltage to be applied be made high. In addition, because the oxygen concentration in the exhaust gas becomes high at the time of fuel cut-off during deceleration operation, it is also preferable that at this time, the electrode 5 be caused to short circuit or the voltage to be applied be made high.

Here, note that based on the electric current detected by the detection device 9, it is determined whether electricity flows between the electrode 5 and the housing 3 through the adhered substances. When electricity does not flow between the electrode 5 and the housing 3 through the adhered substances, the electric current flowing therebetween changes according to an amount of particulate matter which floats in the exhaust gas. Accordingly, when the amount of particulate matter in the exhaust gas is estimated and an electric current corresponding to the amount of particulate matter thus estimated is detected, it can be determined that electricity does not flow between the electrode 5 and the housing 3 through the adhered substances.

On the other hand, when electricity flows between the electrode 5 and the housing 3 through the adhered substances, the electric current detected by the detection device 9 becomes larger. That is, the electric current thus detected (hereinafter also referred to as the detected electric current) becomes larger than the electric current corresponding to the estimated amount of particulate matter in the exhaust gas (hereinafter also referred to as the estimated electric current). Then, if the threshold value is set based on the estimated electric current, it can be determined, by making a comparison between the threshold and the detected electric current, whether electricity flows between the electrode 5 and the housing 3 through the adhered substances. Here, note that the threshold value is set to be a value which is the estimated electric current with a margin given thereto in consideration of tolerances and errors of various kinds of sensors and so on. The threshold value may also be the estimated electric current with a predetermined value added thereto, or may also be the estimated electric current multiplied by a predetermined value.

Then, if the detected electric current is larger than the threshold value, a determination can be made that electricity flows between the electrode 5 and the housing 3 through the adhered substances. Here, note that the amount of particulate matter in the exhaust gas changes according to an operating state of the internal combustion engine, and hence is calculated, for example, according to an operating state of the internal combustion engine. In addition, a sensor for measuring the amount of particulate matter may be provided so that the amount of particulate matter in the exhaust gas can be obtained by the sensor. Moreover, a threshold value at the time of a predetermined operating state (for example, an idle operation state) may have beforehand been calculated through experiments, etc., so that when the internal combustion engine is in the predetermined operating state, it may be determined whether the regeneration processing of the electrode 5 is necessary. Also, threshold values with which the detected electric current is to be compared may have been decided beforehand. In this case, a threshold value may be changed according to an operating state of the internal combustion engine.

Figure 4:
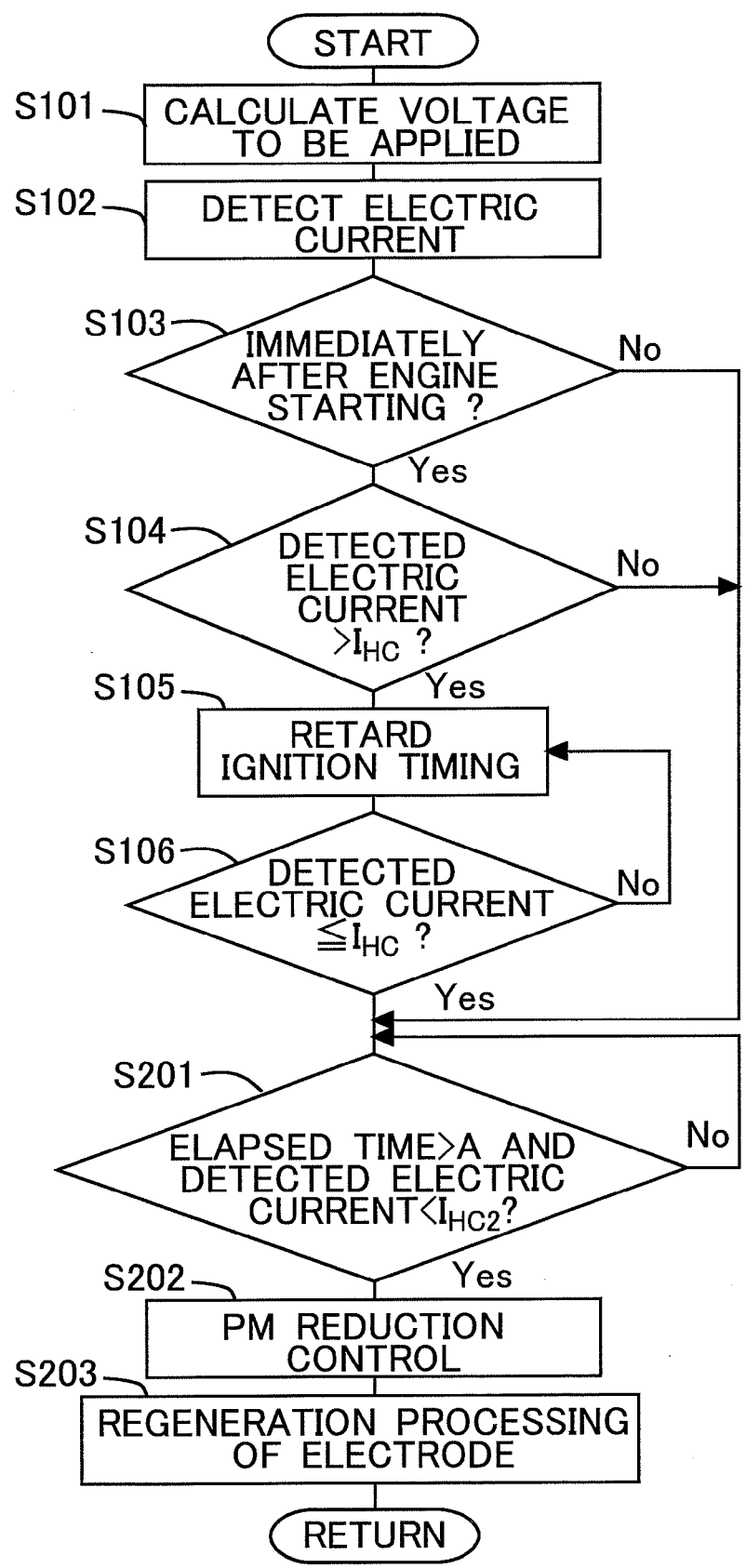
[FIG. 4] is a flow chart showing a control flow according to a second embodiment of the present invention.

FIG. 4 is a flow chart showing a control flow or routine according to this second embodiment. This routine is carried out by means of the control device 7 in a repeated manner at each predetermined time interval. Here, note that for those steps in which the same processing as in the flow shown in FIG. 3 is carried out, the same symbols are attached and an explanation thereof is omitted. In cases where a negative determination is made in step S103 or S104, or in cases where an affirmative determination is made in step S106, the routine goes to step S201.

Here, note that in cases where a determination is made in step S103 that the internal combustion engine is immediately after starting thereof, a voltage to be applied may be made lower than the voltage to be applied which has been calculated in step S101. If doing so, the deterioration of the power supply 6 and the like due to the ionic current can be suppressed. Then, the detected electric current may be obtained again.

In step S201, it is determined whether a time elapsed from the starting of the internal combustion engine is longer than a prescribed period of time A, and it is also determined whether a detected electric current is less than a threshold value $I_{HC2}$. In this step, it is determined whether there is a fear that the concentration of HC may go up after this. That is, when the elapsed time from the starting of the internal combustion engine is short, the state of combustion has not yet become stable, so even if the concentration of HC has once dropped, there is a fear that the concentration of HC may go up again.

In addition, even if the detected electric current is equal to or less than the threshold value $I_{HC}$, when HC is contained in the exhaust gas, the detected electric current will be affected. This detected electric current is used when PM reduction control is carried out, and also when regeneration processing of the electrode 5 is carried out. Then, when an ionic current resulting from HC is contained in the detected electric current, these processings will become difficult. Accordingly, it is determined whether the detected electric current has dropped to a sufficient extent.

The elapsed time from the starting of the internal combustion engine may also be, for example, an elapsed time from a point in time at which processing for starting the internal combustion engine is started, or an elapsed time from a point in time at which the number of engine revolutions per unit time has gone up to an idle rotation. The predetermined time A varies according to which of the elapsed times is adopted. The predetermined time A has beforehand been obtained through experiments, etc., as a time taken for the amount of HC discharged from the internal combustion engine to drop to a sufficient extent. The threshold value $I_{HC2}$ has beforehand been obtained through experiments, etc., as an electric current detected when the amount of HC discharged from the internal combustion engine becomes so small that a determination as to whether regeneration of the electrode 5 is necessary or PM reduction processing can be made. Here, note that in this embodiment, the control device 7, which carries out the processing of step S201, corresponds to a prohibition device in the present invention. Also, in this embodiment, the threshold value $I_{HC2}$ corresponds to a second threshold value or a third threshold value in the present invention.

In cases where an affirmative determination is made in step S201, the routine goes to step S202, whereas in cases where a negative determination is made, the step S201 is executed again.

In step S202, the PM reduction processing is carried out. In this step, a voltage to be applied for optimizing the aggregation of particulate matter is calculated. The PM reduction processing will be described later.

Then, in step S203, the regeneration processing of the electrode 5 is carried out. The regeneration processing of the electrode 5 will be described later.

Figure 5:
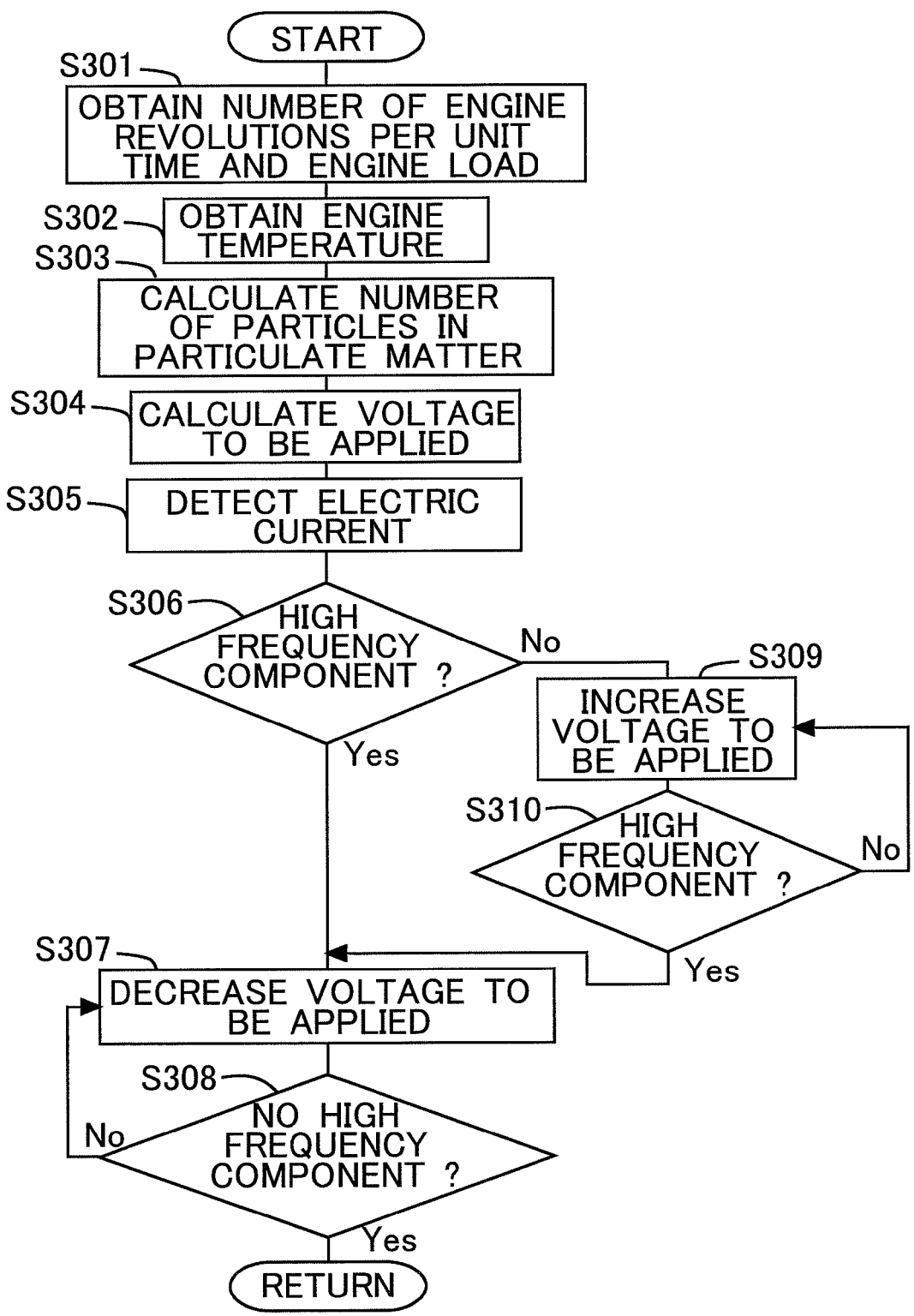
[FIG. 5] is a flow chart showing a control flow of PM reduction control according to the second embodiment.

Next, the PM reduction processing will be explained. FIG. 5 is a flow chart showing a control flow or routine of the PM reduction control according to this second embodiment. This routine is carried out by means of the control device 7 in a repeated manner at each predetermined time interval.

In steps S301 through S303, the number of particles in the particulate matter (pieces/cm$^3$) is calculated. The number of particles in the particulate matter is the number of particles in the particulate matter per cubic centimeter. This number of particles in the particulate matter is the number of particles in the particulate matter which are discharged from the internal combustion engine, and is the number of particles in the particulate matter before the particulate matter flows into the housing 3. The number of particles in the particulate matter has a correlation with the number of engine revolutions per unit time, the engine load, and the temperature of the internal combustion engine (e.g., the temperature of lubricating oil or the temperature of cooling water), and hence is calculated based on these values.

For this reason, in step S301, the number of engine revolutions per unit time and the engine load are obtained. The number of engine revolutions per unit time is detected by the crank position sensor 72, and the engine load is detected by the accelerator opening sensor 71. In addition, in step S302, the temperature of the internal combustion engine is obtained. The temperature of the internal combustion engine is detected by the temperature sensor 73.

In step S303, the number of particles in the particulate matter is calculated. Here, FIG. 6 is a view showing an example of a map for calculating the number of particles in particulate matter from the engine revolutions per minute and the engine load. This relation is stored in plurality in the control device 7 according to the temperature of the internal combustion engine. Then, the number of particles in the particulate matter is obtained from the number of engine revolutions per unit time and the engine load by the use of a map corresponding to the detected temperature of the internal combustion engine. This map has beforehand been obtained through experiments, etc. Here, note that the number of particles in the particulate matter may be detected by the use of such a map, but a sensor for detecting the number of particles in the particulate matter may be mounted on the exhaust passage 2 at a location upstream of the housing 3, so that the number of particles in the particulate matter can also be detected by this sensor.

Subsequently, in step S304, a voltage to be applied to the electrode 5 is calculated based on the number of particles in the particulate matter calculated in step S303. This voltage to be applied is a voltage which is first applied to the electrode 5. Then, by using, as an initial value, the voltage to be applied calculated in step S304, feedback control is carried out so that the voltage to be applied becomes the largest in a range in which no pulse current will be generated. That is, in this step, the initial value of the voltage to be applied is set in order to shorten the time until the largest voltage to be applied is reached in the range in which no pulse current will be generated. The initial value of the voltage to be applied is set based on FIG. 7.

FIG. 7 is a view showing an example of a map for calculating a voltage to be applied (V) based on an amount of exhaust gas (g/sec) from the internal combustion engine, and the number of particles in the particulate matter ($\times 10^5$ pieces/cm$^3$). This map has beforehand been obtained through experiments, etc. The amount of exhaust gas from the internal combustion engine has a correlation with the amount of intake air in the internal combustion engine, and hence, can be obtained based on the amount of intake air detected by the air flow meter 74.

Here, the smaller the amount of exhaust gas, the smaller the inertia force of the particulate matter becomes, and hence, the influence of an electrostatic action becomes relatively large. For this reason, it becomes easy for the particulate matter to aggregate. Accordingly, the smaller the amount of exhaust gas, with the smaller voltage to be applied, the particulate matter aggregates. For this reason, the smaller the amount of exhaust gas, the smaller the voltage to be applied is made. In addition, the more the number of particles in the particulate matter, the shorter become the distances between adjacent particles in the particulate matter, and hence, the influence of the electrostatic action becomes relatively larger. For this reason, the more the number of particles in the particulate matter, with the smaller voltage to be applied, the particulate matter aggregates. As a result, the more the number of particles in the particulate matter, the smaller the voltage to be applied is made.

Here, note that the initial value of the voltage to be applied may also be, for example, such a value that the reduction or decrease rate of the number of particles in the particulate matter becomes a predetermined value (e.g., 40%). In addition, the initial value of the voltage to be applied may also be a specified value which has been set beforehand. This specified value can be made to a value with such a margin that no pulse current is generated.

Then, after the voltage to be applied has been calculated, the routine goes to step S305, in which an electric current is obtained. This electric current is a value which is detected by the detection device 9.

Thereafter, in step S306, it is determined whether there exists a high frequency component of the electric current. A pulse current can be extracted as a high frequency component of the electric current. Accordingly, a high frequency component is extracted by causing the electric current detected by the detection device 9 to pass through a high pass filter. In this manner, in cases where a high frequency component has been extracted by the passage of the electric current through the high pass filter, a determination is made that there exists the high frequency component.

Here, note that the determination as to whether there exists a high frequency component of the electric current can also be made based on whether a standard deviation of the electric current is larger than a predetermined value. Here, a standard deviation S of electric currents detected n times is calculated by the following equation.

$$S = \sqrt{\frac{\sum_{m=1}^{n}(I_m - Iave)^2}{n}} \qquad \text{[Equation 1]}$$

where $I_m$ is the detected electric current, and Iave is an average value of the detected electric current.

It is determined whether the standard deviation S thus calculated is larger than a predetermined value Smax, and if so, a determination is made that there exists a high frequency component. The predetermined value Smax is a fixed value for determining the presence or absence of a high frequency component, and has beforehand been calculated through experiments, etc. In addition, for example, in cases where the rate of rise of the detected electric current is equal to or larger than a threshold value, and in cases where the amount of rise is equal to or larger than a threshold value, a determination can also be made that there exists a high frequency component. Then, in cases where an affirmative determination is made in step S306, the routine goes to step S307.

In step S307, the voltage to be applied is decreased so as to suppress the occurrence of a pulse current. An optimum value for an amount at which the voltage to be applied is decreased may have beforehand been obtained through experiments, etc.

Then, in step S308, it is determined whether there does not exist a high frequency component. That is, it is determined whether the pulse current is no longer generated due to the decrease of the voltage to be applied. This determination is carried out as in step S306. In cases where an affirmative determination is made in step S308, this routine is ended. On the other hand, in cases where a negative determination is made in step S308, a return is made to step S307, and the voltage to be applied is decreased again. In this manner, the voltage to be applied is decreased until the pulse current is not generated.

On the other hand, in cases where a negative determination is made in step S306, the routine goes to step S309.

In step S309, the voltage to be applied is increased. As a result of this, the aggregation of particulate matter is facilitated. An optimum value for an amount at which the voltage to be applied is increased may have beforehand been obtained through experiments, etc.

Then, in step S310, it is determined whether there exists a high frequency component. That is, it is determined whether the pulse current has been generated due to the increase of the voltage to be applied. This determination is carried out as in step S306. In cases where an affirmative determination is made in step S310, the routine goes to step S307 in order to suppress the occurrence of a pulse current. On the other hand, in cases where a negative determination is made in step S310, a return is made to step S309, and the voltage to be applied is increased again. In this manner, the voltage to be applied is increased until a pulse current is generated.

By carrying out feedback control of the voltage to be applied in this manner, the voltage to be applied can be made as high as possible in a range in which a pulse current is not generated. As a result of this, the condensation or aggregation of particulate matter can be further facilitated, so the number of particles in the particulate matter can be further decreased.

Figure 8:
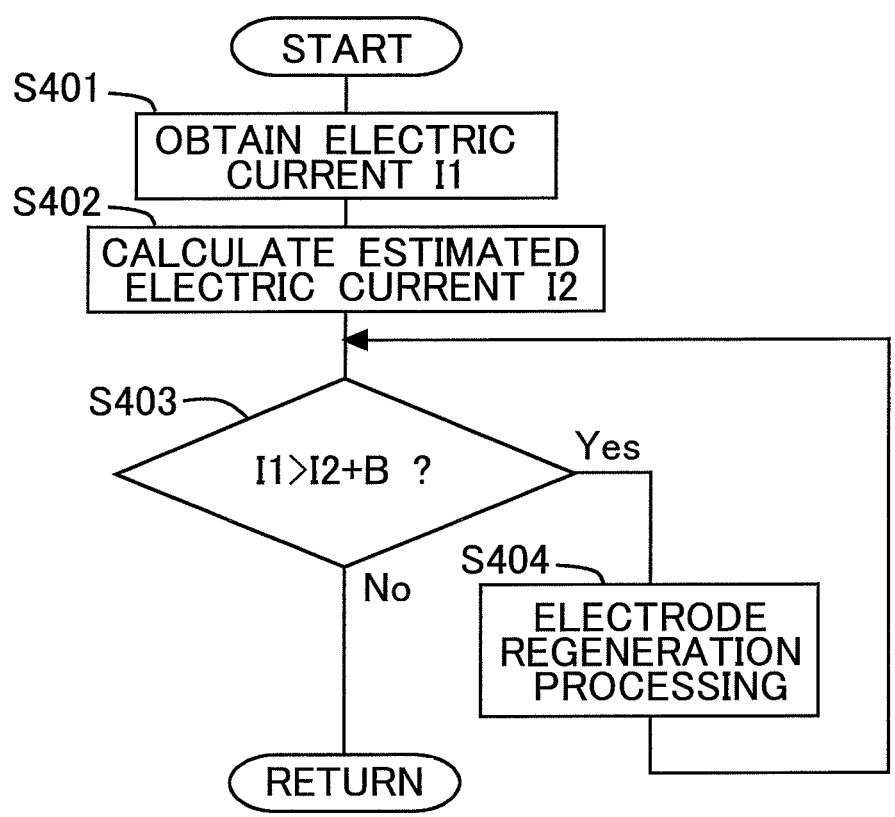
[FIG. 8] is a flow chart showing a flow of regeneration processing of an electrode according to the second embodiment.

Next, the regeneration processing of the electrode 5 will be explained. FIG. 8 is a flow chart showing a flow or routine of the regeneration processing of the electrode 5 according to this second embodiment. This routine is carried out by means of the control device 7. For example, this routine may be carried out each time the vehicle runs a predetermined distance. In addition, this routine may be carried out for each run.

In step S401, the detected electric current I1 is obtained. That is, when a voltage is applied to the electrode 5, an electric current actually detected by the detection device 9 is obtained.

In step S402, an estimated electric current I2 is calculated. That is, an electric current is calculated which is estimated to be detected by the detection device 9 when it is assumed that adhered substances do not exist on the electrode 5.

For example, the number of engine revolutions per unit time and the engine load are in correlation with the amount of particulate matter in the exhaust gas. In addition, there is also a correlation between the amount of particulate matter in the exhaust gas, and the estimated electric current I2. Accordingly, the estimated electric current I2 can be calculated from the number of engine revolutions per unit time and the engine load. These relations have beforehand been obtained through experiments, etc., made into maps, and stored in the control device 7.

In addition, a sensor for detecting the amount of particulate matter in the exhaust gas may be provided, so that the estimated electric current I2 can also be calculated based on the amount of particulate matter obtained by this sensor. This relation has beforehand been obtained through experiments, etc., made into a map, and stored in the control device 7.

In step S403, it is determined whether the detected electric current I1 obtained in step S401 is larger than a value which is the estimated electric current I2 obtained in step S402 and added by a predetermined value B. Here, the value which is the estimated electric current I2 added by the predetermined value B corresponds to a threshold value. The predetermined value B is set so as to provide the estimated electric current with a margin in consideration of tolerances and errors of various kinds of sensors and so on. This predetermined value B can be obtained through experiments, etc., in advance. Then, in this step, it is determined whether the regeneration of the electrode 5 is necessary. If the detected electric current I1 is in the vicinity of the estimated electric current I2, a determination can be made that the insulation of the electrode 5 is ensured.

In cases where an affirmative determination is made in step S403, the routine goes to step S404, whereas in cases where a negative determination is made, this routine is ended. Here, note that in this embodiment, the control device 7, which carries out the processing of step S403, corresponds to a determination device in the present invention.

In step S404, the regeneration processing of the electrode 5 is carried out. That is, the electrode 5 is short-circuited or the concentration of oxygen in the exhaust gas is actively made high, while applying a voltage to the electrode 5. In this manner, the adhered substances on the electrode 5 are removed. After that, the routine returns to step S403. Here, note that in this embodiment, the control device 7, which carries out the processing of step S404, corresponds to a regeneration device in the present invention.

In this manner, a reduction in the insulation of the electrode 5 can be determined based on the detected electric current I1 and the estimated electric current I2. Then, in cases where a determination is made that the insulation of the electrode 5 has been reduced, the regeneration processing of the electrode 5 is carried out.

As described above, according to this second embodiment, PM reduction control is carried out after decreasing the concentration of HC in the exhaust gas in a quick manner, so it is possible to regulate the voltage to be applied at the time when there is no influence of HC on the detected electric current. As a result of this, the voltage to be applied can be adjusted to a more appropriate value. In addition, after decreasing the concentration of HC in the exhaust gas in a quick manner, it is determined whether the regeneration of the electrode 5 is necessary, so such a determination can be made when there is no influence of HC on the detected electric current. As a result, the accuracy of the determination can be enhanced.

(Third Embodiment)

In this third embodiment, in cases where it is estimated that the concentration of HC in the exhaust gas is high, the detected electric current is determined to be an ionic current due to HC, and hence, the regeneration processing of the electrode 5 or PM reduction control is prohibited. The other devices, parts and so on are the same as those in the first and second embodiments, so the explanation thereof is omitted.

Here, as stated above, the concentration of HC in the exhaust gas can be estimated from the detected electric current. In addition, the concentration of HC in the exhaust gas can be estimated to some extent from an operating state of the internal combustion engine or the like. Accordingly, it is possible to estimate, from the detected electric current or the operating state of the internal combustion engine, whether an ionic current due to HC is generated. In addition, by arranging an HC sensor, which detects the concentration of HC, at the upstream side of the housing 3, it is also possible to detect the HC which flows into the housing 3.

When the concentration of HC in the exhaust gas is high, the ionic current becomes large, so the detected electric current is affected to a great extent by the influence of the ionic current. As explained in the above-mentioned step S403, whether the electrode 5 is to be regenerated is determined based on whether the detected electric current I1 is larger than the value which is the estimated electric current I2 added by the predetermined value B. That is, in cases where electricity flows through the adhered substances on the electrode 5, the detected electric current becomes larger than the estimated electric current, so it becomes possible to make a determination based on the detected electric current rather than the estimated electric current. However, even in cases where an ionic current due to HC is generated, too, the detected electric current becomes large. As a result, if it is determined, at the time when an ionic current due to HC is generated, whether the regeneration of the electrode 5 is necessary, there will be a fear that an erroneous determination may be made. For this reason, when the concentration of HC in the exhaust gas is high, the determination as to whether to regenerate the electrode 5 is prohibited. Accordingly, the regeneration processing of the electrode 5 is not carried out.

In addition, in the reduction processing of particulate matter (PM reduction processing), the detected electric current is also used at the time of calculating a voltage to be applied which becomes optimal for facilitating the aggregation of particulate matter. Accordingly, there is a fear that when the detected electric current becomes large under the influence of HC, it may become difficult to calculate an optimal voltage to be applied. For this reason, when the concentration of HC in the exhaust gas is high, the PM reduction processing is prohibited. That is, the processing to calculate the voltage to be applied or to regulate the voltage to be applied is prohibited.

Figure 9:
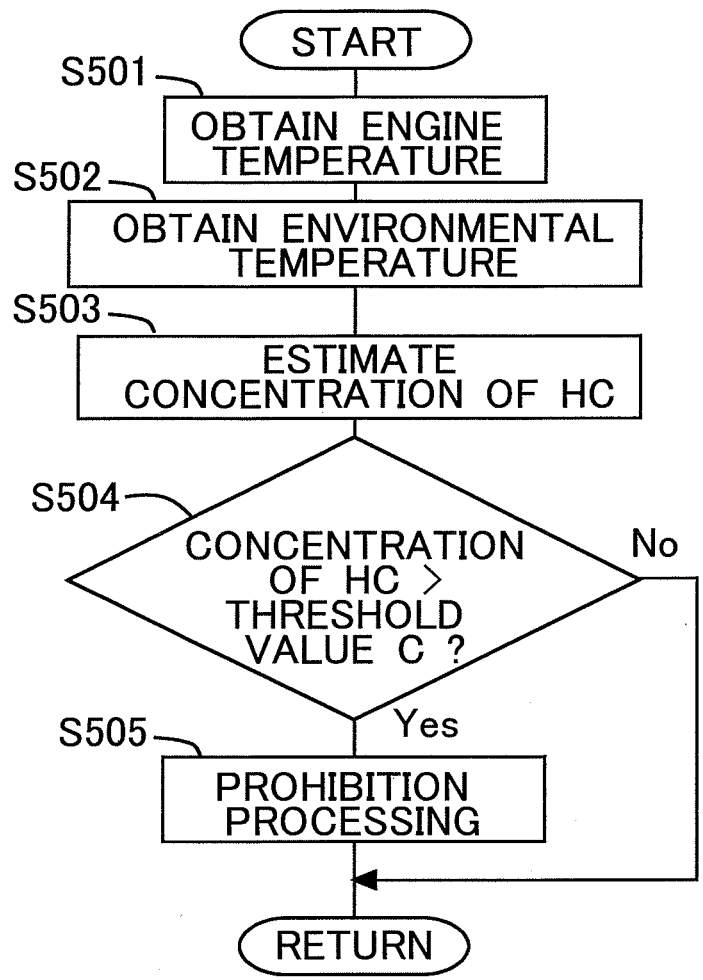
[FIG. 9] is a flow chart showing a control flow according to a third embodiment of the present invention.

FIG. 9 is a flow chart showing a control flow or routine according to this third embodiment. This routine is carried out by means of the control device 7 in a repeated manner at each predetermined time interval.

First, the concentration of HC in the exhaust gas is estimated. For this purpose, the temperature of the internal combustion engine (e.g., the temperature of lubricating oil or the temperature of cooling water) and the temperature of the environment (e.g., the temperature of atmospheric air or the temperature of intake air), which are in correlation with the concentration of HC, are obtained.

That is, in step S501, the temperature of the internal combustion engine is obtained. Then, in step S502, the temperature of the environment is obtained. For example, a sensor for detecting the temperature of atmospheric air is provided so that the environmental temperature is obtained based on this sensor.

In step S503, the concentration of HC is estimated. The relation of the temperature of the internal combustion engine and the environmental temperature with respect to the concentration of HC may have beforehand been obtained through experiments, etc., made into a map, and stored in the control device 7. Also, in this embodiment, a sensor for detecting the concentration of HC may be provided at the upstream side or the downstream side of the housing 3, so that the concentration of HC is detected by this sensor. In addition, the concentration of HC can be estimated from the detected electric current.

In step S504, it is determined whether the concentration of HC estimated in step S503 is higher than a threshold value C. The threshold value C has beforehand been obtained through experiments, etc., as an upper limit value of the concentration of HC which can accurately make a determination as to whether the regeneration of the electrode 5 is necessary, or as an upper limit value of the concentration of HC which can carry out the calculation of the voltage to be applied in an accurate manner, or an upper limit value of the concentration of HC which can carry out the control of the voltage to be applied in an accurate manner. That is, in this step, it is determined whether a determination can be made in an accurate manner as to whether the regeneration of the electrode 5 is necessary, or whether the calculation of the voltage to be applied can be carried out in an accurate manner, or whether the control of the voltage to be applied can be carried out in an accurate manner.

In cases where an affirmative determination is made in step S504, the routine goes to step S505, whereas in cases where a negative determination is made, this routine is ended.

In step S505, prohibition processing is carried out which prohibits the determination of whether the regeneration of the electrode 5 is necessary, the calculation of the voltage to be applied, and the control of the voltage to be applied.

As described above, according to this third embodiment, when a determination is made that the ionic current is large due to the fact that the concentration of HC in the exhaust gas is high, the processing using the detected electric current is prohibited. As a result of this, it is possible to suppress the regeneration of the electrode 5 from being carried out, in spite of the fact that the regeneration of the electrode 5 is not necessary. In addition, because it becomes unnecessary to apply a voltage to the electrode 5, a corresponding circuit can be interrupted, so that it is possible to suppress the power supply 6 and the like from being deteriorated under the influence of an ionic current.

EXPLANATION OF REFERENCE NUMERALS AND CHARACTERS

1 particulate matter processing apparatus
2 exhaust passage
3 housing
4 insulation parts
5 electrode
6 power supply
7 control device
8 battery
9 detection device
21 flange
31 flange
51 insulator part
52 power supply side electric wire
53 ground side electric wire
75 spark plug

The invention claimed is:

1. A particulate matter processing apparatus, said apparatus comprising:
    a processing part with an electrode arranged in an exhaust passage of an internal combustion engine, wherein particulate matter is caused to aggregate by generating a potential difference between the electrode and the processing part;
    a power supply that is connected to said electrode and applies a voltage thereto;
    an insulation part that insulates electricity between said processing part and said exhaust passage;
    a ground part that grounds said processing part;
    an amperemeter configured to detect an electric current in said ground part; and
    an electronic control unit that includes program logic which, when executed estimates a concentration of HC in an exhaust gas based on the electric current detected by said amperemeter at the time when the voltage is applied to said electrode by means of said power supply.

2. The particulate matter processing apparatus as set forth in claim 1,
    wherein said electronic control unit is configured to retard ignition timing of said internal combustion engine more in cases where the electric current detected by said amperemeter is larger than a first threshold value, than in cases where said electric current is equal to or less than said first threshold value.

3. The particulate matter processing apparatus as set forth in claim 2, wherein said electronic control unit controls such that the larger the electric current detected by said amperemeter, the larger the amount of retardation of the ignition timing of said internal combustion engine is made.

4. The particulate matter processing apparatus as set forth in claim 2, wherein said electronic control unit retards the ignition timing at the time of starting of said internal combustion engine.

5. The particulate matter processing apparatus as set forth in claim 1, wherein in cases where the electric current detected by said amperemeter is equal to or less than an upper limit value in cases where the detected electric current is not affected by the influence of the concentration of HC in the exhaust gas, processing to cause the particulate matter to aggregate is carried out.

6. The particulate matter processing apparatus as set forth in claim 1, wherein said electronic control unit is programmed to:
    regenerate said electrode;
    determine, based on the electric current detected by said amperemeter, whether regeneration of the electrode by said electronic control unit is to be carried out; and
    prohibit the determination by said electronic control unit in cases where the electric current detected by said amperemeter is larger than an upper limit value in cases where the detected electric current is not affected by the influence of the concentration of HC in the exhaust gas.

* * * * *